US006615219B1

(12) United States Patent
Bruso et al.

(10) Patent No.: US 6,615,219 B1
(45) Date of Patent: Sep. 2, 2003

(54) DATABASE MANAGEMENT SYSTEM AND METHOD FOR DATABASES HAVING LARGE OBJECTS

(75) Inventors: Kelsey L. Bruso, Minneapolis, MN (US); Ralph W. Conner, Oakdale, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/474,552

(22) Filed: Dec. 29, 1999

(51) Int. Cl.[7] .............................................. G06F 17/30
(52) U.S. Cl. ...................................................... 707/102
(58) Field of Search .......................................... 707/102

(56) References Cited

U.S. PATENT DOCUMENTS

| | | | | |
|---|---|---|---|---|
| 4,993,030 A | * | 2/1991 | Krakauer et al. | 714/6 |
| 5,297,279 A | * | 3/1994 | Bannon et al. | 707/103 R |
| 5,732,402 A | * | 3/1998 | Lehman | 707/100 |
| 5,754,849 A | * | 5/1998 | Dyer et al. | 707/101 |
| 5,799,310 A | * | 8/1998 | Anderson et al. | 707/102 |
| 5,857,203 A | * | 1/1999 | Kauffman et al. | 707/10 |
| 5,895,467 A | * | 4/1999 | Ubell et al. | 707/9 |
| 5,974,416 A | * | 10/1999 | Anand et al. | 707/10 |
| 5,999,943 A | * | 12/1999 | Nori et al. | 707/104.1 |
| 6,035,303 A | * | 3/2000 | Baer et al. | 707/103 R |
| 6,061,678 A | * | 5/2000 | Klein et al. | 707/3 |
| 6,144,970 A | * | 11/2000 | Bonner et al. | 707/2 |
| 6,176,427 B1 | * | 1/2001 | Antognini et al. | 235/454 |
| 6,202,070 B1 | * | 3/2001 | Nguyen et al. | 707/104.1 |
| 6,209,003 B1 | * | 3/2001 | Mattis et al. | 707/206 |
| 6,243,718 B1 | * | 6/2001 | Klein et al. | 707/100 |
| 6,269,394 B1 | * | 7/2001 | Kenner et al. | 709/217 |
| 6,324,573 B1 | * | 11/2001 | Rhoads | 345/749 |
| 6,418,430 B1 | * | 7/2002 | DeFazio et al. | 707/3 |

OTHER PUBLICATIONS

Elmsri et al, Fundamentals of Database Systems, Benjamin/Cummings 1989, p. 76.*

Weiderhold, Database Design, McGraw–Hill 1983, pp. 335–337.*

Haskin, On Extenting the Functions of a Relational Database System, ACM 0–89791–073–7/82/006/0207, 1982.*

Alexandros Biliris, An Efficient Database Storage Structure for Large Dynamic Objects, 1992, pp. 301–308.

Roger L. Haskin & Raymond A. Lorie, On Extending the Functions of a Relational Database System, 1982, pp. 207–212.

* cited by examiner

*Primary Examiner*—Wayne Amsbury
(74) *Attorney, Agent, or Firm*—Charles A. Johnson; Mark T. Starr; Crawford, Maunu PLLC

(57) ABSTRACT

A system and method for managing binary large objects in a database are described in various embodiments. A database management system manages a database table having a plurality of rows of data. Each row includes one or more fixed-length data elements and one or more object identifiers that reference and are associated with respective binary large objects. An object handler coupled to the database management system, the object handler configured and arranged to store each binary large object in a section of contiguous storage referenced by the associated identifier, manages binary large objects.

35 Claims, 11 Drawing Sheets

100

| name | thumbprint | balance | account number | signature |
|---|---|---|---|---|
| *text* | *BLOB* | *numeric* | *text* | *BLOB* |
| *text* | *BLOB* | *numeric* | *text* | *BLOB* |
| *text* | *BLOB* | *numeric* | *text* | *BLOB* |
| | | ... | | |
| *text* | *BLOB* | *numeric* | *text* | *BLOB* |

FIG. 1

DATABASE MANAGEMENT SYSTEM AND METHOD FOR DATABASES HAVING LARGE OBJECTS

FIELD OF THE INVENTION

The present invention generally relates to database management systems, and more particularly to database management systems for managing large objects.

BACKGROUND OF THE INVENTION

Databases traditionally have been used for managing character and numeric data. Example applications include airline reservation systems, banking applications, and stock trading applications. With the dramatic improvements in processor speed, data transmission bandwidth, and storage capacities, data types including video, audio, still images are being stored and manipulated in a wide array of applications. These relatively new data types are represented with a very large quantity of data and are often referred to as binary large objects (BLOBs). Integrating BLOBs into a relational database in a high volume transaction environment presents challenges that cannot be immediately solved with faster processors, additional bandwidth, and more storage.

A relational database can be logically viewed as a table of rows and columns. Each row contains a set of related data items, one or more of which index to the row. A column contains the same type of data, the values of which vary from row-to-row. A significant portion of today's database technology was built when the data items in a database were relatively small. Smaller data items permitted multiple rows of data to be stored in one physical page of storage, thereby enabling retrieval of multiple rows with a single input/output (I/O) operation. A single BLOB however, may require storage that is two or three orders of magnitude greater than that available on a single page. Therefore, storage for a BLOB may span hundreds or thousands of pages of storage. Thus, a BLOB stored as an ordinary data item in a database table may require thousands of I/O operations for retrieval.

Slow retrieval times are unacceptable in high volume transaction environments. For example, biometric data such as fingerprints may be used in combination with a credit card application, where the cardholder's fingerprint is associated with the cardholder's name, account number, and balance. If the cardholder and a vendor are made to wait for an extended period of time, a sale may be lost, the cardholder may quit using the card, and the vendor may no longer accept that credit card.

A system and method that addresses the aforementioned problems, as well as other related problems, are therefore desirable.

SUMMARY OF THE INVENTION

In various embodiments, a system and method are provided for managing binary large objects in a database. A database management system manages a database table having a plurality of rows of data. Each row includes one or more fixed-length data elements and one or more object identifiers that reference and are associated with respective binary large objects. An object handler coupled to the database management a system, the object handler configured and arranged to store each binary large object in a section of contiguous storage referenced by the associated identifier, manages binary large objects. Among other advantages, the contiguous storage of the binary large objects reduces data access times, and storage of the object identifiers in the database table eases adaptation of a database management system to accommodate binary large objects.

In accordance with an example embodiment of the invention, there is provided a computer program product that is configured to be operable to manage binary large objects in a database.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which:

FIG. 1 illustrates an example database table in which the database includes non-BLOB and BLOB data;

Figure 2:
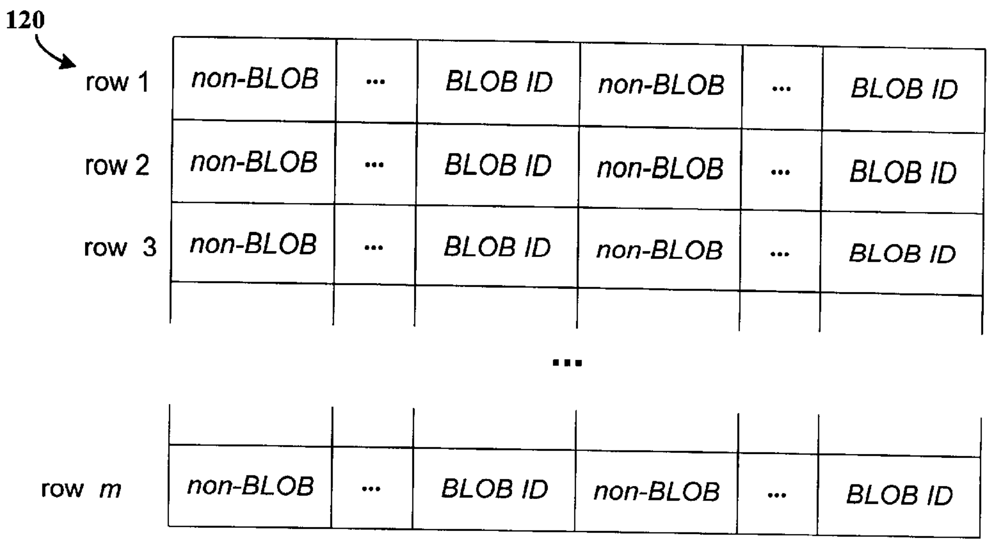
FIG. 2 illustrates a database table for managing non-binary and binary data in accordance with one embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION

FIG. 1 illustrates a database table 100 for an example transaction in which the database includes non-BLOB and BLOB data. The table is not intended to depict the actual data structures involved in managing the data. Rather, the table is intended to illustrate an example relation of non-BLOB and BLOB data. A set of related BLOB data will be referred to as a "BLOB." A "BLOB" generally represents a complex data object that has an internal structure that is not necessarily important or visible to the database engine. Thus, a BLOB is stored as a very long string of binary digits that are handled as an object. The BLOB may be a very long string of discrete binary data, such as an image in raw format or a segment of a binary encoded signal. Alternatively, a BLOB could be an image in an encoded format including multiple groups of discrete data, such as video.

The text and numeric fields in the example table are fixed length fields such as those conventionally included in relational databases. For example, name may be a fixed length character string, and balance may be a real number represented with a fixed number of bits. BLOBs, on the other hand, may be fixed or variable length data objects, depending on the application. As will be described in the following figures, BLOBs can be items of a relation in a database. Each BLOB can be retained in contiguous storage so that BLOBs can be read or written with a single I/O operation.

FIG. 2 illustrates a database table for managing non-binary and binary data in accordance with one embodiment of the invention. Each of rows l–m in the example database includes non-BLOB data, for example, text and/or numeric data, and BLOB identifiers (ID) which reference BLOBs.

In one embodiment a BLOB identifier includes an address code, a length code, and a cyclic redundancy check (CRC) code. The address is the storage address at which the BLOB begins and can be used to construct an I/O request for transfer of the BLOB from storage to memory.

The length code indicates the number of words comprising the BLOB and is used to indicate in the I/O request the number of words to read from storage. Since each BLOB is stored contiguously, a single I/O request can be used to retrieve a BLOB. Contiguous storage refers to consecutive physical storage addresses.

The CRC code is used to determine whether a BLOB has been corrupted. The CRC code is generated when a BLOB is inserted in the database. When the BLOB is retrieved from the database, the stored CRC can be compared to the CRC code which is generated when the BLOB is read.

Figure 3:
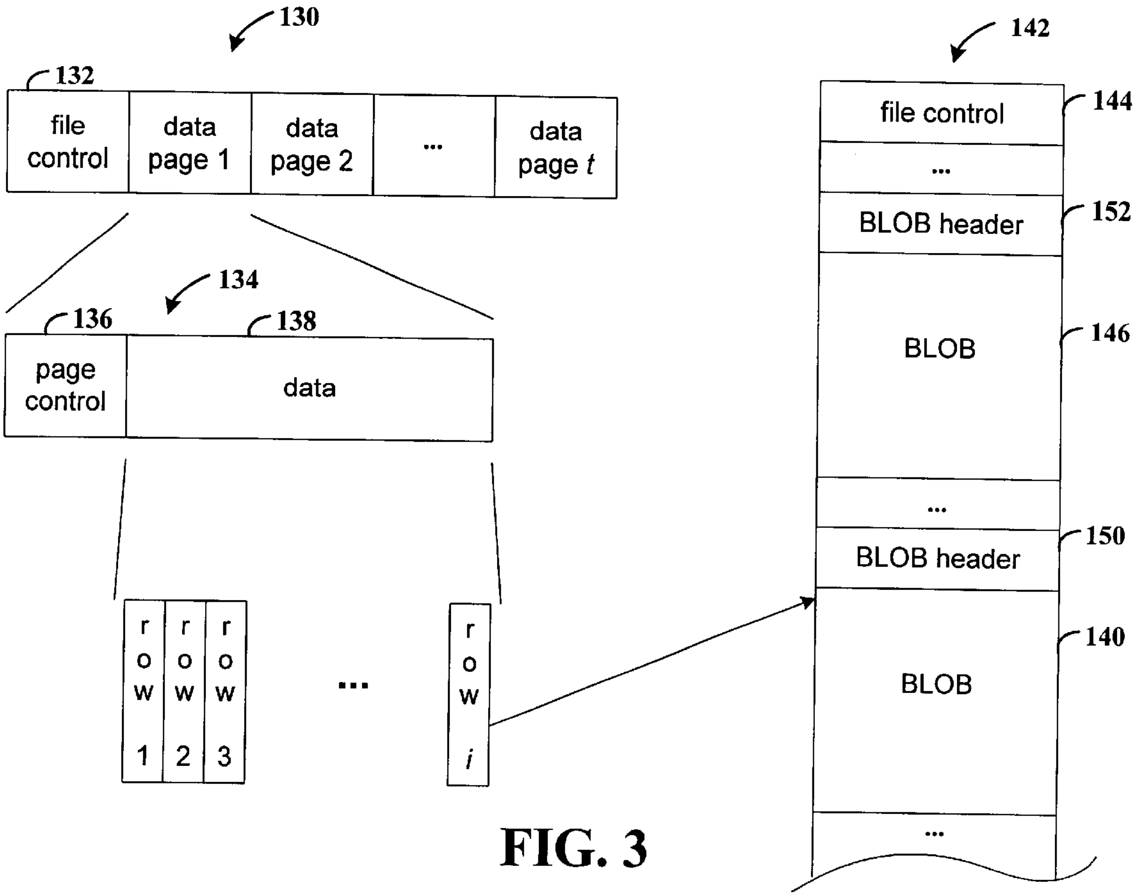
FIG. 3 illustrates one embodiment of a storage layout for a database table having non-BLOB and BLOB data.

FIG. 3 illustrates one embodiment of a storage layout for a database table having non-BLOB and BLOB data. File 130 is a logical view of file 130 for storage of a database table. Thus, the actual storage occupied by file 130 may not be contiguous. Alternatively, file 130 may be arranged in contiguous storage in other embodiments. File 130 includes file control block 132, along with a plurality of data pages 1–t. File control block 132 is that conventionally associated with a data file and whose contents are dependent upon the database management system. The data pages 1–t store application-specific information. In this context, "application" refers to the database management system that is responsible for file 130.

The content of each of data pages 1–t is illustrated by page 134. In an application such as a database management system, each page includes page control block 136 and data block 138. The content of page control block 136 is specific to the application controlling the page. For example, a database management system includes a page number code which tells the number of the page, a page size code which tells the size of the page, number of words on the page available for records, and number of words on the page already used for records for allocating space from the page to data records.

Each data block 138 stores one or more rows 1–i of data, depending upon the number of elements within a row and the lengths of the elements. For a database having BLOBs, each row includes one more pointers to physical storage addresses of BLOBs. For example, row i, has a pointer to the storage address of BLOB 140. The number of pointers in each row depends on the number of BLOBs in each row. For databases having non-BLOB data related to BLOB data, each of rows 1–i also has stored therein the non-BLOB data. As illustrated in FIG. 2, the non-BLOB data is stored directly in the table, and for BLOBs, BLOB IDs are stored in the table.

BLOB file 142 is a data file that occupies contiguous storage. It will be appreciated that multiple BLOB files may be employed for storage of different types of BLOBs. For example, one file may be used for storing finger prints, and another file may be used for storing signatures.

BLOB file 142 includes file control block 144 and a plurality of BLOBs 140, 146, with each BLOB having an associated BLOB header 150, 152 that precedes the BLOB.

A BLOB header includes the following data items that are used for managing the associated BLOB:

Number of pages is the number of consecutive data pages comprising storage of the BLOB (including the header page).

Validation string is data that is used to detect page corruption and to detect where BLOB images start. In one embodiment, the data is the character string "IaMaBlOb".

Creation timestamp is the time at which the BLOB was written to the storage area and has a precision level of nanoseconds. In one embodiment, the creation timestamp is used to validate the ownership of a BLOB image by its 'owning' row. The creation time of the row must match the creation time of the corresponding BLOB.

Deletion timestamp is the time at which the BLOB was deleted from the storage area and has a precision level of nanoseconds. If BLOB data page is on the file's free chain, the deletion timestamp must be set and its value must be greater than the creation timestamp.

Deletion step-ID is the step-ID of the thread which deleted the BLOB. The step-ID is used to suppress writing a new BLOB into the same space as a BLOB that is being deleted. This allows roll-back of a DELETE followed by an INSERT. "Step" is a term used to identify a set of related, uncommitted, data base modifications in the transaction modifying the database.

CRC code is a cyclic redundancy check that can be used to detect database corruption.

Control Table entry references the entry in the allocation control table (see FIG. 4A) that controls the portion of the storage space in which this BLOB is stored.

Previous BLOB header references the BLOB header that precedes the BLOB header in the BLOB file 112.

Next BLOB header references the BLOB header that follows the BLOB header in the BLOB file 112.

Figure 4A:
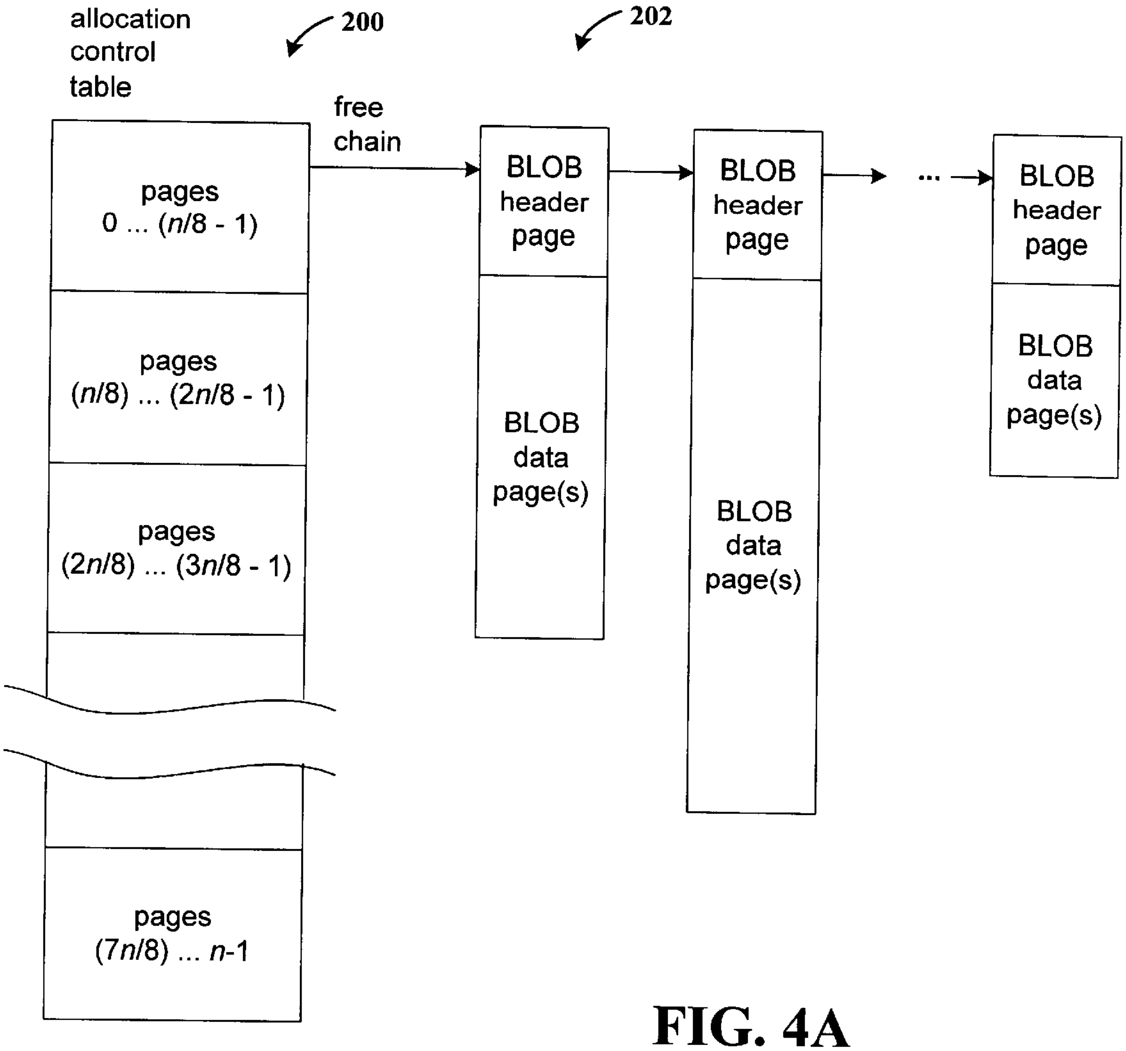
FIG. 4A is a block diagram that shows an allocation control table for managing BLOB storage space.

Free chain link references the next BLOB header page in the free chain (See FIG. 4A).

FIG. 4A is a block diagram that shows an allocation control table 200 for managing BLOB files. Allocation control table 200 is used to control how space is allocated to BLOBs. In one embodiment, allocation control table 200 has 8 entries, each for controlling allocation for a portion of the BLOB file. For a BLOB file having n pages, the first table entry controls pages 0 through (n/8−1), the second table entry controls pages n/8 through (2n/8−1), . . . , and the eighth table entry controls pages 7n/8 through (n−1). Eight transactions can concurrently allocate BLOB storage.

Space in the BLOB storage area is allocated by tracking freed pages and never-used pages. Freed pages are pages in which BLOBs were once stored and subsequently deleted. Never-used pages are pages of storage that have never been allocated for storing BLOBs. When allocating storage for a BLOB, the freed pages are considered first for available storage followed by the never-used pages. For underlying file systems which assign file space as needed rather than pre-assigning the maximum file size, reusing pages before writing to new, never-used pages minimizes the file size.

When a row containing a BLOB is deleted, the pages in which the BLOB was stored are added to the free chain of the associated entry of allocation control table 200. Free chain 202 is illustrated for the first entry in allocation control table 200. While not shown, it will be appreciated that each of the remaining entries in allocation control table 200 also includes an associated free chain. Each free chain includes BLOB header pages, each of which physically precedes the associated contiguous BLOB data pages.

Each allocation control table 200 entry tracks the never-used pages in the associated portion of the BLOB file. The never-used pages are tracked by maintaining a file-relative page index to the first never-used page in the portion of storage (next$_{13}$ avail$_{13}$ page$_{13}$ no). Another file-relative page index to the last never-used page controlled by the control table entry is also maintained (page$_{13}$ no$_{13}$ upper$_{13}$ limit). When there are no more never-used pages within a portion of the BLOB storage area, next_avail$_{13}$ page$_{13}$ no=page$_{13}$ no$_{13}$ upper$_{13}$ limit+1. Keeping track of never-used pages by means of two indices rather than chaining the pages together as is done for free pages allows the DBMS to minimize the file usage and only request file space from the underlying file system when writing BLOB data to the file.

Figure 4B:
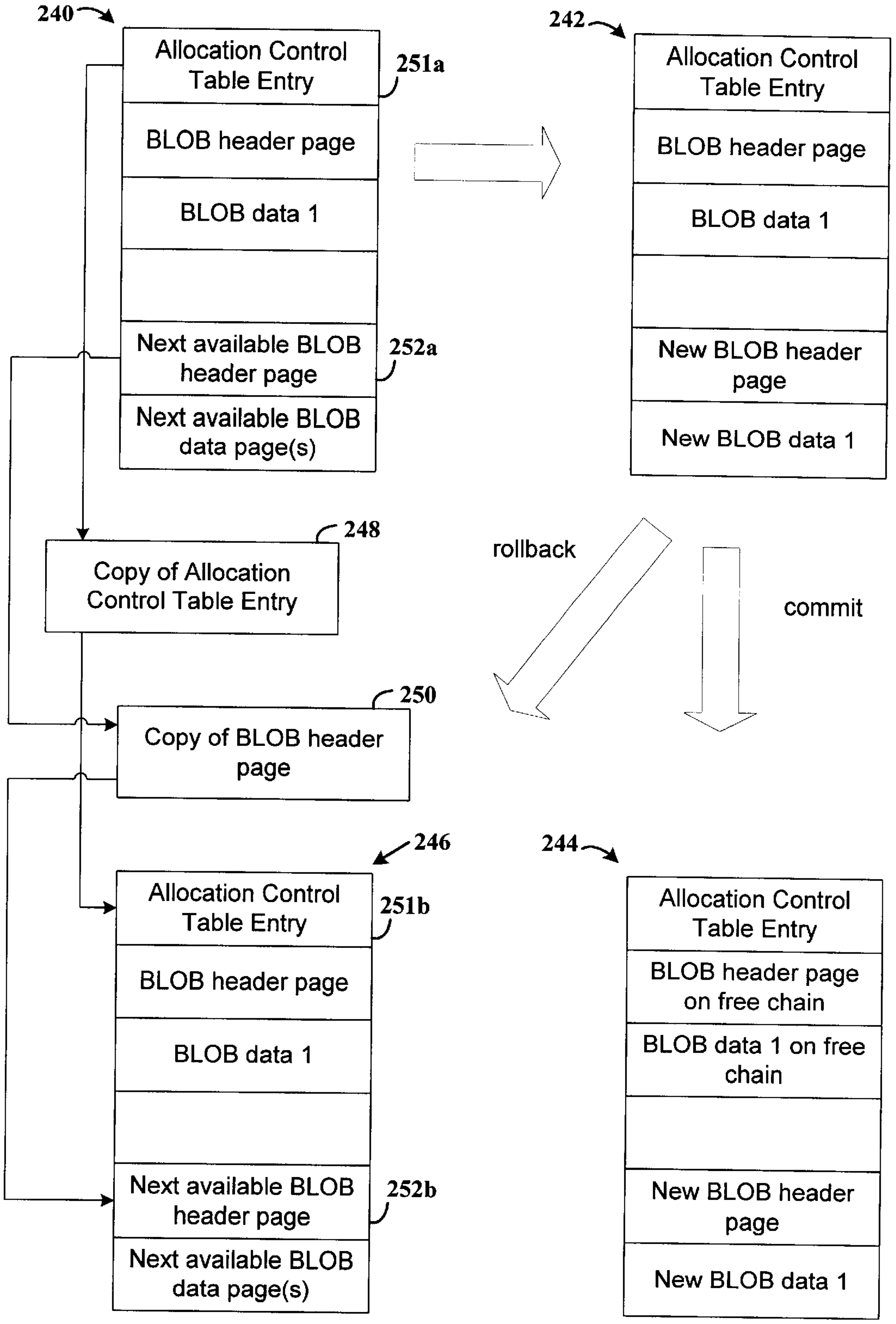
FIG. 4B is a block diagram that shows how the system supports rollback of an update to a BLOB.

FIG. 4B is a block diagram that shows how the system supports rollback of database updates made by a transaction. In this diagram, the term "update" is used generically to describe the function of replacing an existing BLOB data item. The update could be accomplished with a single update operation or with a pair of operations such as a delete operation followed by an insert operation. In both cases the database update must be able to be undone or rolled back. The key features of transactions are described by four properties: atomicity, consistency, isolation, and durability. These are known as the ACID properties of a transaction and are fully supported by a DBMS and, consequently, by all transactions under its control.

Atomicity requires that either all elements of a transaction complete or none of them do. In this sense, all elements form an atomic unit of work which cannot be left in a partially completed state. The step-ID identifies each such atomic unit for a transaction. A transaction signals completion of a set of updates by issuing a "commit" request to the DBMS. If the transaction wishes to abandon the updates, it issues a "rollback" request to the DBMS. The DBMS itself can also perform a rollback if it detects an error while processing the transaction's requests.

The Consistency requirement stipulates that the system is always in a consistent state—before, during, and after a transaction. The completion of a transaction must provide a correct state or the entire transaction (by the Atomicity requirement) must be undone (rolled back).

Transaction Isolation means that concurrent transactions cannot depend on the intermediate state of other transactions. Put another way, a transaction in an intermediate state must not affect other transactions on the system. Transactions must be serializable and coordinate serial access to shared resources. Many DBMS isolation strategies use database locks to ensure isolation. In this embodiment of the invention, the BLOB handler uses locking. Locking as an isolation technique is not essential to the invention. Other equivalent isolation techniques could be employed.

The Durability requirement is that transactions, once completed (committed), effect a permanent change. In a file-based DBMS, this means that all updates have been written to the storage files and other transactions can see the resulting database updates.

In one technique for maintaining the Atomicity property, the DBMS makes a copy of the data base page before making any updates to it on behalf of the transaction. This copy of the data page is called a "before look". Then, if the transaction's updates are rolled back, the DBMS has a copy of the original contents of the page which it uses to restore the page to its original state. Due to the large size of BLOB images, making a copy of the pages containing the BLOB before updating the BLOB pages takes a prohibitively long time to accomplish. To solve this problem, BLOB handler 306 functions as described in the following paragraphs.

Block 240 illustrates the initial state of a database prior to performing a delete request. In processing a delete request, BLOB handler 306 links the BLOB header page (which precedes the BLOB value) into the free chain for the allocation control table from which the space was originally allocated. It sets the step-ID code in the BLOB header page to be the step-ID of the transaction which performed the delete operation. Writing the step-ID to the BLOB header page allows the BLOB handler to avoid reallocating the space to the same transaction until after the transaction makes a commit or rollback request which, in turn allows the BLOB handler to avoid making a copy of the unmodified BLOB pages (i.e., no before look of the pages is required). The DBMS only makes a before look copy 248 of allocation control table entry 251*a* and a before look copy 250 of the BLOB header page 252*a*.

After the database update is performed, the database is in an intermediate state as shown by block 242.

If the transaction requests a commit, the copy of the allocation control table entry 248 and the BLOB header page 250 are discarded and the database updates are made permanent as shown by block 244, which represents the new state of the database.

If the transaction requests a rollback, in the general case, the DBMS replaces all updated pages with the before look copies of the pages, as shown by block 246. For pages related to BLOB operations, the following operations are required. If the transaction performed an insert operation, the rollback writes the copy 248 of the allocation control table entry back to the file at 251*b* so the space that had been used by the new BLOB data value is again made available. If the BLOB header page came from the free chain, the rollback of the BLOB header page changes writes the copy 250 of the BLOB Header Page back to the file at 252*b* which effectively puts the BLOB header page back into the free chain.

If the transaction performed a delete operation, the rollback writes the copy 248 of the allocation control table entry back to the file at 251*b* so the space is removed from the free chain. The copy 250 of the BLOB header page is written back to the file at 252*b* so the page is not marked as deleted and is not a part of the free chain. Since the BLOB handler never reuses space on the free chain whose step-ID matches the step-ID of the transaction, the pages involved in the insert operation cannot be the same pages as are involved in the delete operation.

Although the embodiment described herein uses the before look technique, after looks and deferred updates could be used in other embodiments to achieve the same goal and work in conjunction with the present invention.

Figure 5A:
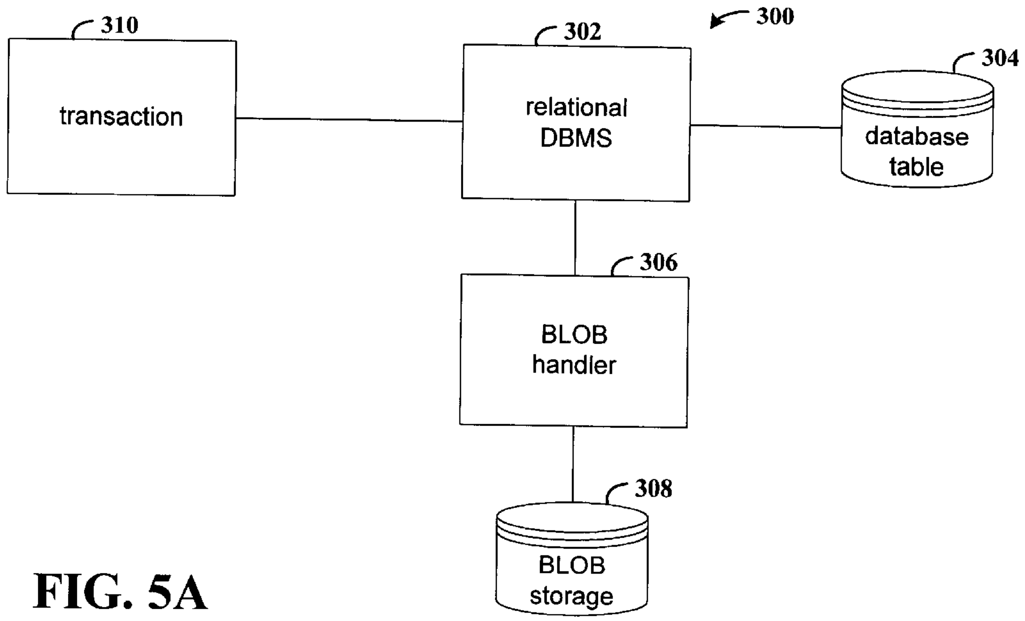
FIG. 5A is a functional block diagram of a system for managing BLOB data in a relational database in accordance with one embodiment of the invention.

FIG. 5A is a functional block diagram of a system 300 for managing BLOB data in a relational database in accordance with one embodiment of the invention. System 300 includes relational database management system (DBMS) 302 that manages database table 304 and BLOB handler 306, which manages BLOBs stored in BLOB files 308. In one embodiment, the RDMS software product from Unisys has been adapted to manage BLOBs in accordance with the present invention. It will be appreciated that database management systems from other vendors, such as IBM, Oracle, Sybase, and Microsoft could be modified to manage BLOBs within the scope of the present invention. Depending on the nature of the BLOBs, database table 304 and BLOB file 308 may be on the same or on different devices. Transaction 310 represents any computer software program which can make requests to a database management system; it is not limited to a specific type of software program which may be called a transaction.

Instead of storing BLOBs within rows of database table 304, references to the BLOBs are stored in the rows. Thus, database table 304 includes rows having non-BLOB data along with references to BLOBs. For example, if the table includes names of people and associated signatures, the rows have character data for peoples' names and references to the associated signatures in BLOB storage 308.

Storing references to BLOBs in a database table instead of storing the BLOBs in the table supports contiguous storage of data for an individual BLOB. By storing BLOB data in contiguous storage locations, the number of I/O operations required to access the data can be reduced to one.

The control flow for manipulating a BLOB is as follows. Application program 310 calls DBMS 302 for services, for example to process an SQL SELECT query or other suitable database access request. In response, DBMS 302 accesses the file containing the data referenced in the request, wherein the referenced data is a row in database table 304. DBMS 302 calls BLOB handler 306 to access BLOB file 308 using the references found in the aforementioned row in database table 304. For operations where a BLOB is to be returned to application program 310 (e.g., a SELECT), the referenced BLOB is read from contiguous storage of BLOB storage 308 and written to a memory location provided by transaction 310.

It will be appreciated that in various embodiments the invention can be hosted on different computing platforms. For example, in one embodiment the application and database management system could be hosted by a single system such as the 2200 series data processing systems from Unisys. In another embodiment, functions of and data accessed by the transaction, DBMS, and BLOB handler could be distributed on nodes of a network.

Figure 5B:
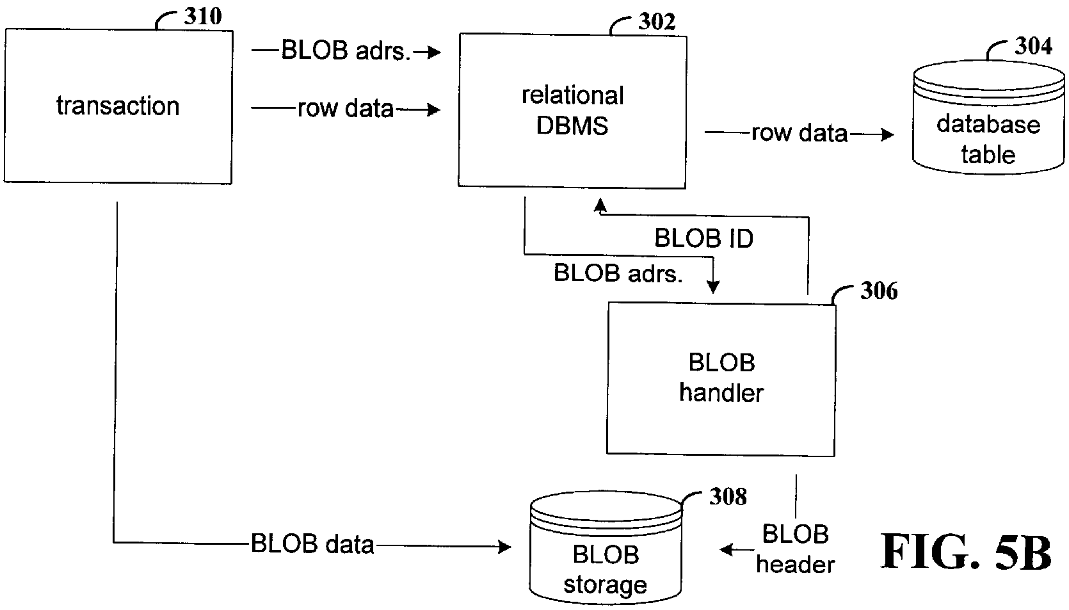
FIG. 5B is a data flow diagram for inserting a BLOB into a database.

FIG. 5B is a data flow diagram for inserting a BLOB into a database. Transaction 310 calls DBMS 302 with an INSERT request that includes the data for the row to insert into the database along with a memory address(es) of one or more BLOBs that are associated with the row.

DBMS 302 passes the BLOB address(es) to BLOB handler 306, and the BLOB handler allocates space in BLOB storage 308 for the BLOB(s). The operating system (not shown) is called by BLOB handler 306 to write the BLOBs directly from the memory address(es) to BLOB storage 308. The operating system (not shown) is called by BLOB handler 306 to write the BLOB header page from the BLOB handler's working space to BLOB storage 308. The identifier(s) associated with the BLOB(s) is returned to DBMS 302, and the new row of data, including the identifier(s), is written to database table 304.

Figure 5C:
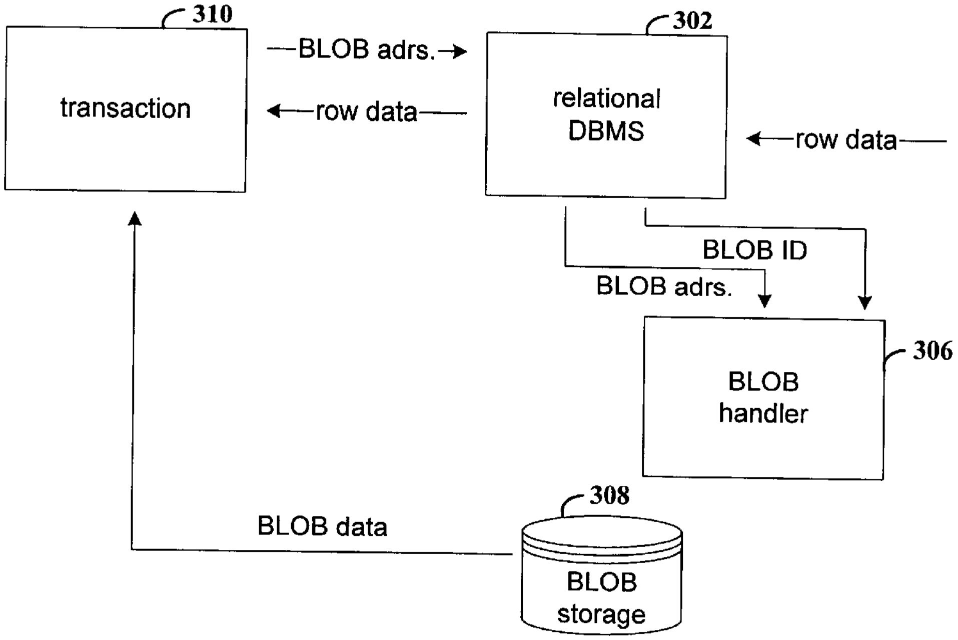
FIG. 5C is a data flow diagram for selecting a row of a database having one or more BLOBs.

FIG. 5C is a data flow diagram for selecting a row of a database having one or more BLOBs. Application program 310 calls DBMS 302 with an SELECT request that includes the selection criteria along with a memory address(es) at which the BLOB(s) is to be written.

DBMS 302 retrieves the selected row from database table 304 and returns the non-BLOB data contained in the row to application 310. The BLOB identifier(s) from the row is passed to BLOB handler 306 along with the transaction memory address(es) at which the BLOB(s) is to be written. BLOB handler 306 calls the operating system to read the BLOB(s) referenced by the BLOB identifier(s) directly from BLOB storage 308 and write the BLOB(s) to transaction memory at the supplied address(es).

Figure 6:
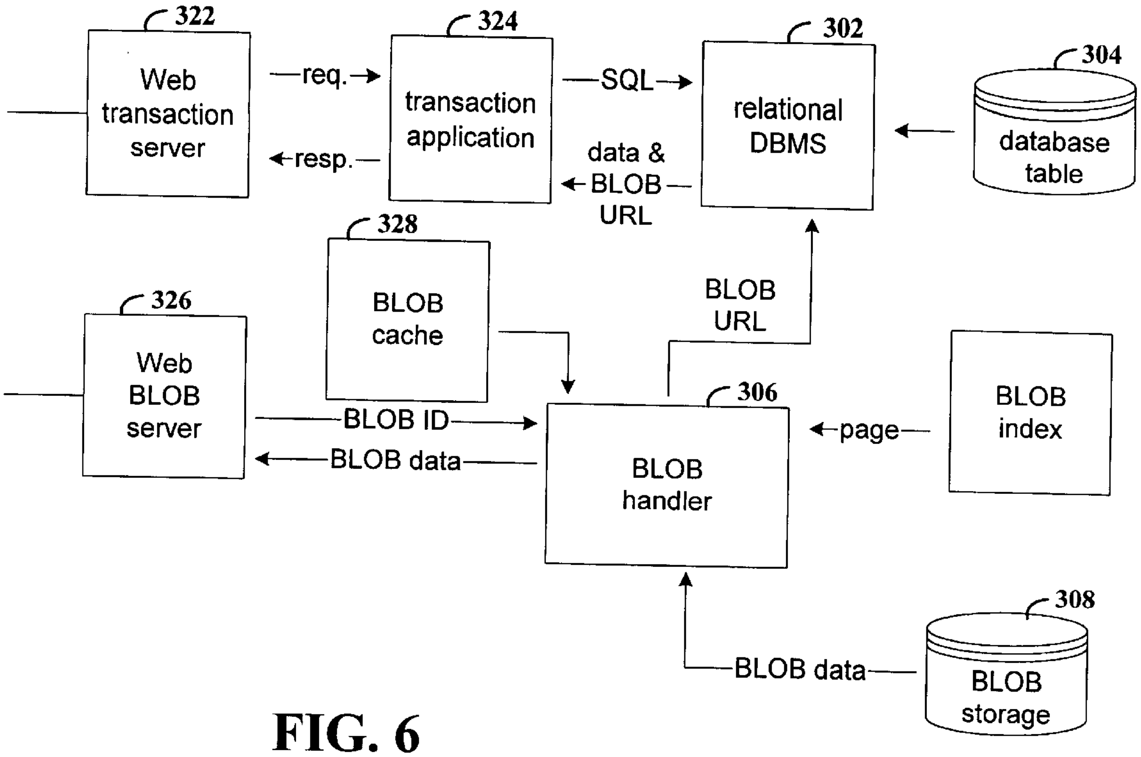
FIG. 6 is a data flow diagram illustrating BLOB selection in a database management system having a Web interface.

FIG. 6 is a data flow diagram illustrating BLOB selection in a database management system having a Web interface ("Web" is short for World Wide Web), in accordance with another embodiment of the invention. System includes Web transaction server 322, transaction 324, and Web BLOB server 326, in addition to DBMS 302 and BLOB handler 306.

Web transaction server 322 receives a database request over an I/O port to which it is coupled and calls transaction application 324. The request is passed to DBMS 302, and transaction application 324 returns a response containing data from the database to transaction server 322. It will be appreciated that the database data may be included in an HTML form, for example, or in other formats common to Web applications.

The data returned to the application includes non-BLOB data from a row database table 304 and a reference(s) to the BLOB(s) contained in the row. The reference(s) to a BLOB(s) returned to the requesting application may take the form of a Uniform Resource Locator (URL) in one embodiment. A URL referencing a BLOB allows the requesting application to transmit a BLOB request to Web BLOB server 326 to retrieve the BLOB. The URL includes the same information as depicted in FIG. 5B where BLOB handler 306 returns a BLOB ID to relational DBMS 302, but the information is packaged in a URL-compatible format. Web BLOB server 326 calls BLOB handler 306 with the BLOB identifier contained in the request. If the referenced BLOB is cached, BLOB handler 306 reads the BLOB from cache 328 and returns the BLOB to Web BLOB server 326, which returns the BLOB to the requesting application. Otherwise, BLOB handler 306 uses the URL to read the BLOB from BLOB storage 308.

Figure 7:
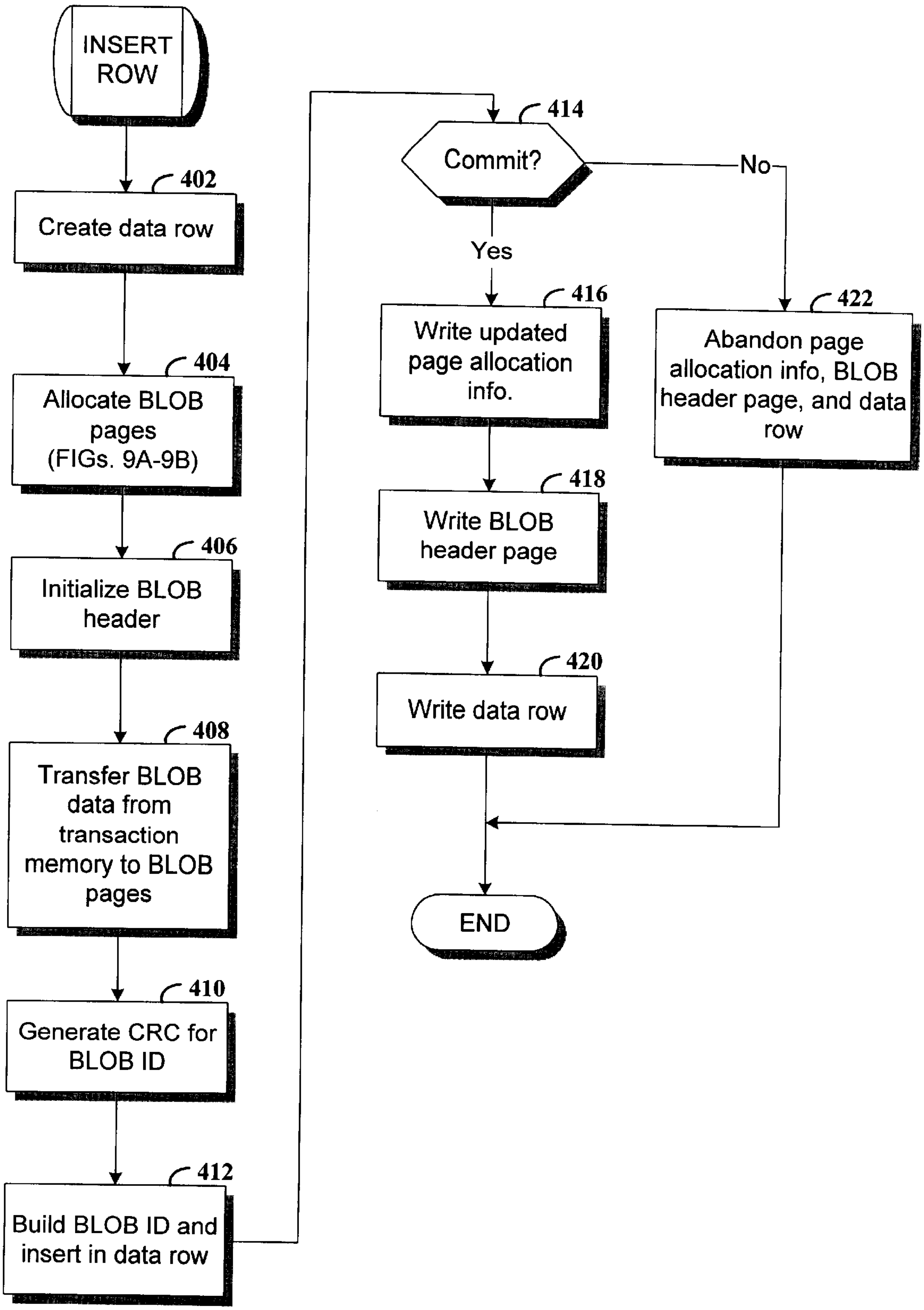
FIG. 7 is a flowchart of a process for inserting a row having one or more BLOBs in a database table.
Figures 9, 9A:
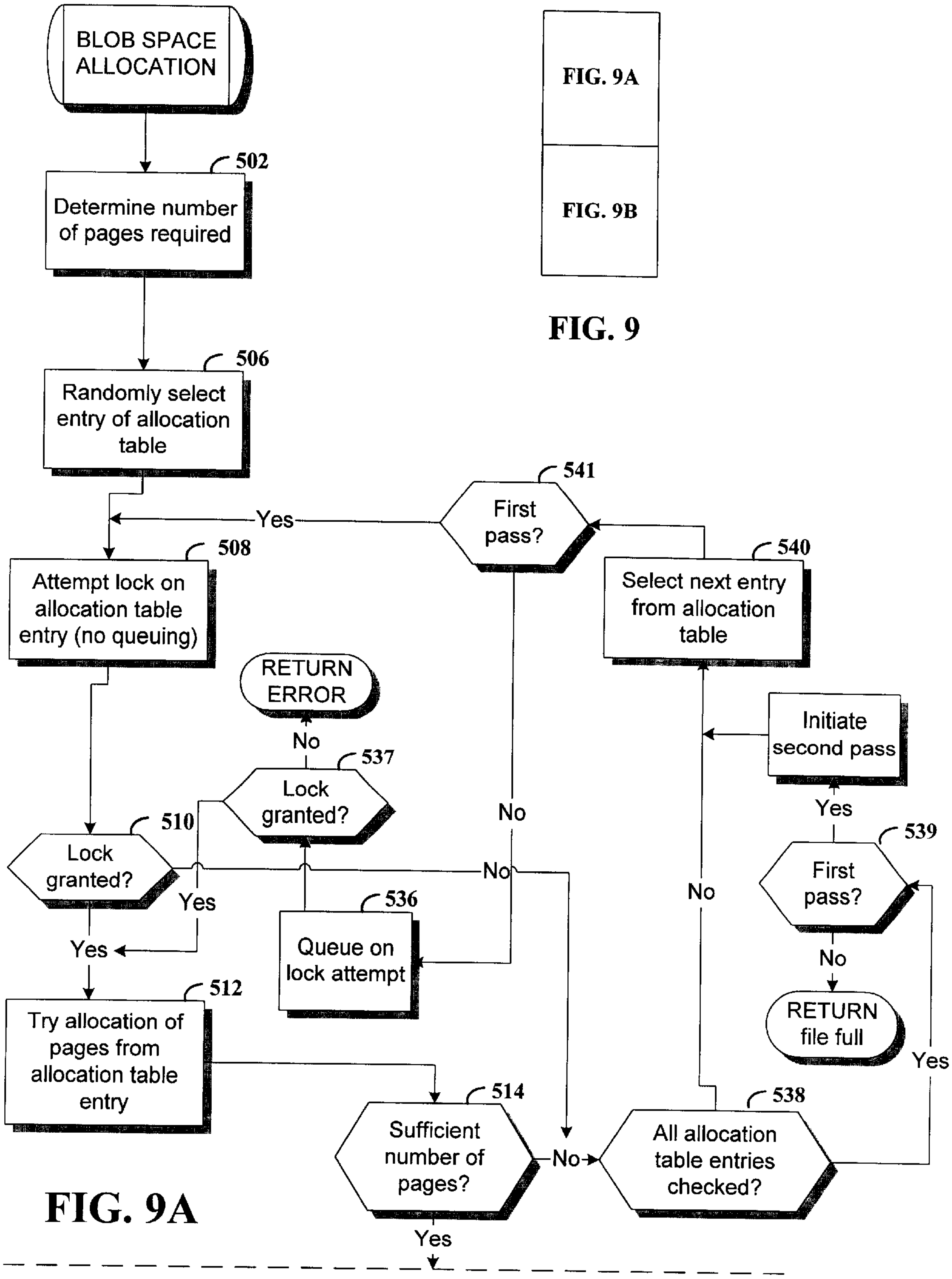
FIG. 9 shows the positional relationship between FIGS. 9A and 9B, which together comprise a flowchart of a process for allocating storage for a BLOB in accordance with one embodiment of the invention.
Figure 9B:
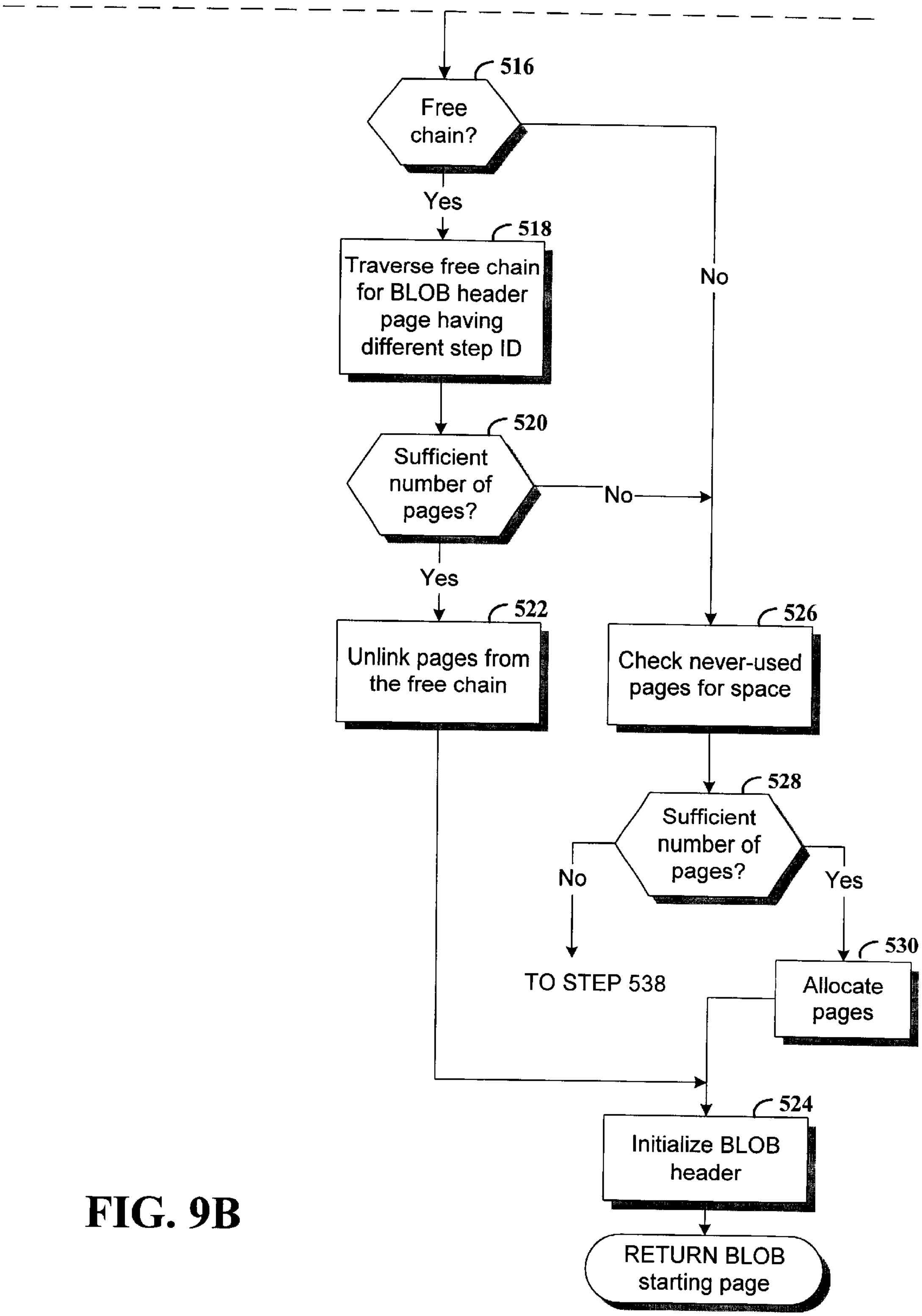

FIG. 7 is a flowchart of a process for inserting a row having one or more BLOBs in a database table. The process generally entails conventional processing by DBMS 302 for inserting a row of non-BLOB data along with processing related to management of BLOB storage 308. The process of FIG. 7 is described in terms of inserting a row having a single,BLOB. It will be appreciated that if the row contained multiple BLOBs, steps 404–418 can be repeated for managing the additional BLOBs. At step 402, DBMS 302 allocates storage for the row of data to insert, and BLOB storage is allocated at step 404. FIGS. 9A–9B further describe the process of allocating BLOB storage.

At step 406, the BLOB header is initialized with the information previously described. The data comprising the BLOB is transferred from the application memory to the allocated storage at step 408. Since the allocated storage is contiguous, the transfer can be accomplished with a single I/O operation.

A CRC code is generated at step 410 from the BLOB and is stored as part of the BLOB ID in the database table. Recall that the CRC code can be later referenced to determine whether the stored BLOB has been corrupted. At step 412, the information for the BLOB ID is assembled and written in the row of the database being inserted.

If the transaction issues a commit request whereby the results of the insert-row operation are made permanent, decision step 414 directs control to step 416 where the updated information for allocation control table 200 is written to storage. At step 418, the BLOB header constructed at step 406 is written to BLOB storage 308, and the row data (containing the BLOB ID) is written to database table 304 at step 420.

If the transaction issues a roll back request or if the DBMS detects a processing error which prevents the insert-row operation from being committed, the BLOB pages allocated at step 404 are returned to the appropriate free chain of allocation control table 200, along with the BLOB header page.

Figure 8:
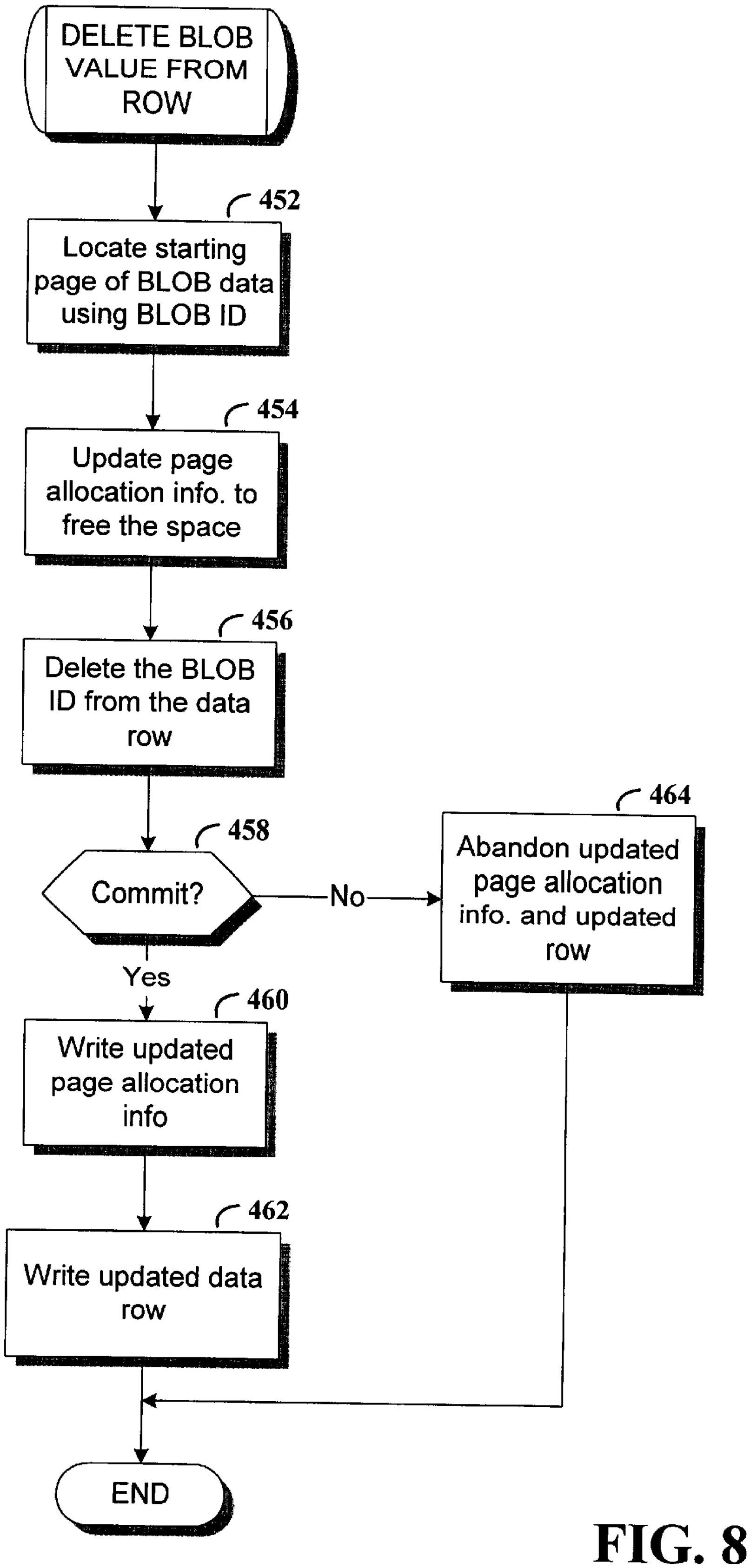
FIG. 8 is a flowchart of a process for deleting a BLOB value from a row of a database table.

FIG. 8 is a flowchart of a process for deleting a BLOB value from a row of a database table. The process generally entails finding the storage associated with the BLOB value and returning the storage to a free chain of allocation control table 200.

At step 452, the storage address of the BLOB value to delete is obtained from the BLOB ID in the database row referenced in the delete operation. The appropriate free chain in allocation control table 200 is updated at step 454 to include the BLOB data pages from the deleted BLOB value. In addition, the step-ID associated with the thread deleting the BLOB value is stored in the BLOB header page that is returned to the free chain. The step-ID is used for recovery purposes. That is, if the transaction which initiated the deletion of the BLOB value also entails inserting a BLOB value (for example, delete a signature and insert a thumbprint), then the BLOB data pages having the deleted BLOB value are not made available for storing the inserted BLOB value. This allows the deleted BLOB value to be recovered after the other BLOB value has been inserted and before the transaction has committed.

At step 456, the BLOB ID is deleted from the row of the database. If the transaction issues a commit request whereby the results of the delete operation can be committed, decision step 458 directs processing to step 460 where the updated information for allocation control table 200 is written to the BLOB file. At step 462, the updated row data is written to the non-BLOB file.

If the transaction issues a roll back request whereby results of the delete operation are abandoned, the updates made to allocation control table 200 are abandoned. That is, the BLOB data pages of the deleted BLOB value are removed from the free chain. In addition, the BLOB ID is restored to the row of the database.

FIG. 9 shows the positional relationship between FIGS. 9A and 9B, which together comprise a flowchart of a process for allocating storage for a BLOB in accordance with one embodiment of the invention. The process generally entails scanning allocation control table 200 for available storage space for the BLOB.

At step 502, the number of BLOB data pages required for storage of the BLOB is calculated, based on the size of the BLOB. The size of the BLOB is included with the BLOB itself as part of the BLOB value. Since the process for allocating BLOB storage is premised on serving multiple transactions simultaneously, this embodiment of the invention uses locks to coordinate manipulation of the allocation control table. Thus, locks may be attempted on multiple table entries before a lock is granted. In other embodiments of the invention, other control mechanisms, for example, semaphores or test and set cells, could be used to serialize access to data structures such as the allocation control table.

The BLOB handler makes two passes through the allocation control table. On the first pass, it does not queue on the lock attempts. This allows processing to proceed as quickly as possible since the BLOB pages are spread evenly across the allocation control table entries. If a lock is denied for an entry it means that another transaction is trying to allocate space from that entry and the BLOB handler moves on and tries the next allocation control table entry until it arrives back where it started. If not enough space has been found to fulfill the request on the first pass through the table, a second pass through the table is initiated. The second time through the control table the processing queues on each lock request so it can examine each allocation control table entry in an attempt to fulfill the space request.

At step 540, a next entry from the allocation control table is selected. In one embodiment of the invention, there are eight entries in the allocation control table. A starting entry is picked at random in step 506. It is examined and at step 540, its successor is chosen. After the eighth entry is examined, processing continues with the first entry, continuing in a circular fashion, until the starting entry is reached. When the starting entry is reached again, the test in step 538 returns an indication that all table entries have been checked.

At step 506, one of the entries from allocation control table 200 is randomly selected. Any random number generating technique can be used; for example, many operating systems provide a random number service or the least significant digits of the current time in nanoseconds could be used as a random number. Randomly choosing a starting entry in the allocation control table spreads the BLOB data evenly across the file and helps to avoid lock conflicts when multiple transactions are requesting space simultaneously. An attempt is made to lock the selected entry at step 508. If the lock is granted, decision step 510 directs processing to step 512, where the BLOB header pages are examined to determine whether there is sufficient contiguous storage available in the portion of BLOB storage controlled by the selected table entry. If there is insufficient space available on the free chain, the never-used pages are considered for allocation. If there is sufficient storage (either in the free chain or never-used pages), decision step 514 directs processing to decision step 516 (FIG. 9B).

Decision step 516 tests whether the available storage was found on the free chain. If so, processing is directed to step 518. To allocate space from the free chain, the step-ID ID in the BLOB header page to be allocated must be different from the step-ID of the thread seeking the allocation. As described above, this preserves the ability to roll back a deleted BLOB if the deletion was performed in the same atomic processing unit of the same transaction as the insertion. Thus, at step 518, the BLOB header pages in the free chain are scanned for a step-ID that is different from the step-ID of the thread requesting the allocation.

If there are a sufficient number of pages linked to a BLOB header page having a different step-ID, decision step 520 directs processing to step 522. The identified BLOB header page, along with the BLOB data pages, are unlinked from the free chain at step 522. At step 524, the BLOB header page is initialized with the information described above, and processing is complete with return of the address of the allocated pages.

If sufficient space was unavailable on the free chain, or the only space available was that associated with the step-ID of the current transaction, control is directed to step 526 (via decision steps 516 or 520). At step 526, the never-used pages are checked for sufficient storage space. If there is a sufficient number of never-used pages (decision step 528), the number of never-used pages is decremented at step 530, and processing continues at step 524 as described above. Otherwise, processing returns to step 538 to try the next allocation control table entry.

Returning now to decision step 510, if a lock was not granted on the selected entry of allocation control table 200, decision step 510 directs control to decision step 538. If more allocation control table entries remain unexamined, step 538 directs control to step 540 where the next table entry is selected. If this is the first pass through the allocation control table, control again passes to step 508.

Returning to decision step 514. If decision step 514 finds insufficient storage available in the current entry of the allocation control table, control is directed to decision step 538 in order to consider the storage controlled by the other entries of the allocation control table.

At decision step 538, if locks have been attempted on all the entries of the control table, decision step 538 directs control to step 539. If this is the first pass through the allocation control table, step 539 directs control to step 534, where the second pass through the allocation control table entries begins. Processing continues with step 540 where the next allocation control table entry is selected. At decision step 541, it is no longer the first pass so processing continues at step 536, attempting to lock the allocation control table entry—with queuing. Decision step 537 tests whether the lock request is successful. If the lock is granted, processing resumes at step 512. If the lock is denied due to a timeout, deadlock, or other reason, step 537 returns an error to the caller.

Returning to decision step 539. If this is the first pass, processing continues with pass two at step 534. If this is the second pass through the allocation control table entries, the BLOB handler returns a file full status. All the allocation control table entries have been examined and there is not enough space to fulfill the request.

Accordingly, the present invention provides, among other aspects, a system and method for managing BLOBs in a relational database. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A computer-implemented method for managing binary large objects in a database management system, comprising:

constructing a database table having a plurality of rows of data, each row including one or more fixed-length data elements and one or more object identifiers referencing and associated with respective binary large objects;

maintaining each binary large object in a section of contiguous storage reference by the associated identifier;

storing an information header before each section of contiguous storage;

storing file addresses of binary large objects as part of the object identifiers;

constructing an allocation control table having a plurality of entries, each entry referencing an associated portion of storage; and locking the allocation control table entry prior to allocating storage for a binary large object from the portion of storage associated with the table entry, thereby limiting allocation of storage within an associated portion of storage to one transaction at a time and controlling multi-transaction access to the storage area of the binary large objects.

2. The method of claim 1, further comprising:

reading one or more rows of data from the database table in response to a request from a transaction;

returning the data elements from the one or more rows of data to the transaction;

obtaining one or more object identifiers from the one or more rows of data; and transferring the one or more binary large objects referenced by the one or more object identifiers from one or more sections of contiguous storage to memory locations in the request.

3. The method of claim 2, wherein the one or more binary large objects are directly transferred from the one or more sections of contiguous storage to memory locations without staging the binary large object data through the database management system.

4. The method of claim 1, further comprising:

allocating one or more sections of contiguous storage for the one or more binary large objects in response to a request from a transaction to insert a row of data in the database table; and transferring one or more large binary objects from memory locations referenced in the request to the one or more sections of contiguous storage.

5. The method of claim 4, wherein one or more large binary objects are directly transferred from the one or more sections of contiguous storage to memory locations without staging the binary large object data through the database management system.

6. The method of claim 1, further comprising:

reading one or more rows of data from the database table in response to a request from a transaction;

returning to the transaction and data elements from the one or more rows of data and Uniform Resourse Locations reflecting the one or more binary objects; and in response to the Uniform Resource Locators received from the transaction transferring the one or more binary large objects from storage to the transaction.

7. The method of claim 1, further comprising:

tracking sections of contiguous storage that are available for storage of additional binary large objects;

maintaining information headers associated with the available sections of contiguous storage;

storing creation timestamps in the information headers associated with sections of contiguous storage having stored binary large objects, wherein the creation timestamp references a time at which an associated binary large object was stored; and storing deletion timestamps in information headers associated with available sections of contiguous storage, wherein the deletion timestamp references a time at which an associated binary large object was deleted; and detecting corruption of an available section of contiguous storage where the associated information header has a creation timestamp greater than its deletion timestamp.

8. The method of claim 1, further comprising:

tracking sections of contiguous storage that are available for storage of additional binary large objects;

maintaining information headers associated with the available sections of contiguous storage;

storing transaction-control identifiers in information headers associated with available sections of contiguous storage, wherein a transaction-control identifier references a transaction that deleted an associated binary large object;

if a transaction submits a delete request followed by an insert request selecting an available section of contiguous storage for the insert request other than an available section of contiguous storage having the transaction-control identifier of the transaction stored in the information header.

9. The method of claim 1, further comprising:

generating a first cyclic redundancy check code from a binary large object when the binary large object is inserted;

storing the first cyclic redundancy check code in the associated information header;

generating a second cyclic redundancy check code from a binary large object when the binary large object is read; and detecting corruption of the binary large object where the first and second cyclic redundancy check codes are unequal.

10. The method of claim 1, further comprising:

randomly selecting one of the entries in the allocation control table to add a row to a table under control of an insert transaction;

attempting to lock the one of the entries for the insert transaction; and attempting to lock successive ones of the allocation control table entries until a lock is granted if the lock on the one of the entries is denied to the insert transaction.

11. The method of claim 10, further comprising queuing to lock the one of the entries if locks where denied to the insert transaction on the previous ones of the entries.

12. The method of claim 1, further comprising:

testing whether there is sufficient storage available for a binary large object referenced by the row in the locked allocation control table entry;

storing the binary large object in the storage associated with the one of the entries if there is sufficient storage available; and if there is insufficient storage available in the one of the entries, testing for available storage associated with successive entries of the allocation control table until sufficient storage is found.

13. The method of claim 1, further comprising, establishing separate files for binary large objects of different data types, wherein the binary objects are stored in files according to data type.

14. An apparatus for managing binary large objects in a database management system, comprising:

means for constructing a database table having a plurality of rows of data, each row including one or more fixed-length data elements and one or more object identifiers referencing and associated with respective binary large objects;

means for maintaining each binary large object in a section of contiguous storage referenced by the associated identifier;

means for storing an information header before each section of contiguous storage;

means for storing file addresses of binary large objects as part of the object identifiers;

means for constructing an allocation control table having a plurality of entries, each entry referencing an associated portion of storage; and means for locking the allocation control table entry prior to allocating storage for a binary large object from the portion of storage associated with the table entry, thereby limiting allocation of storage within an associated portion of storage to one transaction at a time and controlling multi-transaction access to the storage area of the binary large objects.

15. The method of claim 14, further comprising:

means for reading one or more rows of data from the database table in response to a request from a transaction;

means for returning the data elements from the one or more rows of data to the transaction;

means for obtaining one or more object identifiers from the one or more rows of data; and means for transferring the one or more binary large objects referenced by the one or more object identifiers from one or more sections of contiguous storage to memory locations referenced in the request.

16. A system for managing binary large objects, comprising:

a database management system configured and arranged to manage a database table having a plurality of rows of data, each row including one or more fixed-length data elements and one or more object identifiers including file addresses of respective binary large objects; and an object handler coupled to the database management system, the object handler configured and arranged to maintain each binary large object in a section of contiguous storage referenced by the associated identifier, store an information header before each section of contiguous storage, construct an allocation control table having a plurality of entries, each entry referencing an associated portion of storage and lock the allocation control table entry prior to allocating storage for a binary large object from the portion of storage associated with the table entry, thereby limiting allocation of storage within an associated portion of storage to one transaction at a time and controlling multi-transaction access to the storage area of the binary large objects.

17. The system of claim 16, wherein the database management system is further configured and arranged to read one or more rows of data from the database table in response to a request from a transaction and return the data elements from the one or more rows of data to the transaction; and the object handler is further configured and arranged to transfer one or more binary large objects referenced by the one or more object identifiers from one or more sections of contiguous storage to memory locations referenced in the request.

18. A computer-implemented method for managing binary large objects in a database management system comprising:

maintaining a database table having a plurality of row of data, each row including one or more fixed-length data elements and one or more object identifiers referencing and associated with respective binary large objects;

storing each binary large object in a respective section of contiguous storage;

preserving contiguous storage of each binary large object for as long as the binary large object is referenced by the database table;

constructing an allocation control table having a plurality of entries, each entry referencing an associated portion of storage; and locking the allocation control table entry prior to allocating storage for a binary large object from the portion of storage associated with the table entry, thereby limiting allocation of storage within an associated portion of storage to one transaction at a time and controlling multi-transaction access to the storage area of the binary large objects.

19. The method of claim 18, further comprising:

reading one or more rows of data from the database table in response to a request from a transaction;

returning the data elements from the one or more rows of data to the transaction;

obtaining one or more object identifiers from the one or more rows of data; and transferring the one or more binary large objects referenced by the one or more object identifiers from one or more sections of contiguous storage to memory locations referenced in the request.

20. The method of claim 19, wherein the one or more binary large objects are directly transferred from the one or more sections of contiguous storage to memory locations without staging the binary large object data through the database management system.

21. The method of claim 18, further comprising:

allocating one or more sections of contiguous storage for the one or more binary large objects in response to a request from a transaction to insert a row of data in the database table; and transferring the one or more binary large objects from memory locations referenced in the request to the one or more sections of contiguous storage.

22. The method of claim 21, wherein the one or more binary large objects are directly transferred from the one or more sections of contiguous storage to memory locations without staging the binary large object data through the database management system.

23. The method of claim 18, further comprising:

reading one or more rows of data from the database table in response to a request from a transaction;

returning to the transaction the data elements from the one or more rows of data and Uniform Resource Locators referencing the one or more binary large objects; and in response to the Uniform Resource Locators received from the transaction, transferring the one or more binary large objects from storage to the transaction.

24. The method of claim 18, further comprising:

storing an information header before each section of contiguous storage; and storing file addresses of binary large objects as part of the object identifiers.

25. The method of claim 24, further comprising:

tracking sections of contiguous storage that are available foe storage of additional binary large objects;

maintaining information headers associated with the available sections of contiguous storage;

storage creation timestamps in the information headers associated with sections of contiguous storage having stored binary large objects, wherein the creation timestamp references a time at which an associated binary large object was stored; and storing deletion timestamps in information headers associated with available sections of contiguous storage, wherein the deletion timestamp references a time at which an associated binary large object was deleted; and detecting corruption of an available section of contiguous storage where the associated information header has a creation timestamp greater than its deletion timestamp.

26. The method of claim 24, further comprising:

tracking sections of contiguous storage that are available for storage of additional binary large objects;

maintaining information headers associated with the available sections of contiguous storage;

storing transaction-control identifiers in information headers associated with available sections of contiguous storage, wherein a transfer-control identifier references a transaction that deleted an associated binary large object;

if a transaction submits a delete request followed by an insert request, selecting an available section of contiguous storage for the insert request other than an available section of contiguous storage having the transaction-control identifier of the transaction stored in the information header.

27. The method of claim 24, further comprising:

generating a first cyclic redundancy check code from a binary large object when the binary large object is inserted;

storing the first cyclic redundancy check code in the associated information header;

generating a second cyclic redundancy check code from a binary large object when the binary large object is read; and detecting corruption of the binary large object where the first and second cyclic redundancy check codes are unequal.

28. The method of claim 18, further comprising controlling multi-transaction access to the storage area of the binary large objects.

29. The method of claim 28, further comprising:

constructing an allocation control table having a plurality of entries, each entry referencing an associated portion of storage;

locking the allocation control table entry prior to allocating storage for a binary large object from the portion of storage associated with the table entry, thereby limiting allocation of storage within an associated portion of storage to one transaction at a time.

30. The method of claim 29, further comprising:

randomly selecting one of the entries in the allocation control table to add a row to a table under control of an insert transaction;

attempting to lock the one of the entries for the insert transaction; and attempting to lock successive ones of the allocation control table entries until a lock is granted if the lock on the one of the entries is denied to the insert transaction.

31. The method of claim 30, further comprising queuing to lock the one of the entries if locks were denied to the insert transaction on the previous ones of the entries.

32. The method of claim 29, further comprising:

testing whether there is sufficient storage available for a binary large object referenced by the row in the locked allocation control entry;

storing the binary large object in the storage associated with the one of the entries if there is sufficient storage available; and if there is insufficient storage available in the one of the entries, testing for available storage associated with successive entries of the allocation control table until sufficient storage is found.

33. The method of claim 18, further comprising, establishing separate files for binary large objects of data types, wherein the binary objects are stored in files according to data type.

34. An apparatus for managing binary large objects in a database management system, comprising:

means for maintaining a database table having a plurality of rows of data, each row including one or more fixed-length data elements and one or more object identifiers referencing and associated with respective binary large objects;

means for storing each binary large object in a respective section of contiguous storage;

means for preserving contiguous storage of each binary large object for as long as the binary large object is referenced by the database table;

means for constructing an allocation control table having a plurality of entries, each entry referencing an associated portion of storage; and means for locking the allocation control table entry prior to allocating storage for a binary large object from the portion of storage associated with the table entry, thereby limiting allocation of storage within an associated portion of storage to one transaction at a time and controlling multi-transaction access to the storage area of the binary large objects.

35. A system for managing binary large objects, comprising:

a database management system configured and arranged to maintain a database table having a plurality of rows of data, each row including one or more fixed-length data elements and one or more object identifiers referencing and associated with respective binary large objects; and an object handler coupled to the database management system, the object handler configured and arranged to store each binary large object in a respective section of contiguous storage and preserve contiguous storage of each binary large object for as long as the binary large object is referenced by the database table, construct an allocation control table having a plurality of entries, each entry referencing an associated portion of storage, and lock the allocation control table entry prior to allocating storage for a binary large object from the portion of storage associated with the table entry, thereby limiting allocation of storage within an associated portion of storage to one transaction at a time and controlling multi-transaction access to the storage area of the binary large objects.

* * * * *

UNITED STATES PATENT AND TRADEMARK OFFICE

CERTIFICATE OF CORRECTION

PATENT NO. : 6,615,219 B1
DATED : September 2, 2003
INVENTOR(S) : Bruso et al.

It is certified that error appears in the above-identified patent and that said Letters Patent is hereby corrected as shown below:

Column 11,
Line 62, "reference by" should read -- referenced by --.

Column 12,
Line 21, "locations in the request." should read -- locations referenced in the request. --.
Line 35, "wherein one" should read -- wherein the one --.
Line 43, "transaction and data elements" should read -- transaction the data elements --.
Line 44, "Resourse" should read -- Resource --.
Line 45, "Locations reflecting" should read -- Locators referencing --.
Line 47, "transaction transferring" should read -- transaction, transferring --.

Column 13,
Line 12, "request selecting" should read -- request, selecting --.
Line 40, "locks where denied" should read -- locks were denied --.

Column 15,
Line 67, "storage creation timestamps" should read -- storing creation timestamps --.

Column 17,
Line 13, "objects of data types," should read -- objects of different data types --.

Signed and Sealed this

Twenty-third Day of December, 2003

JAMES E. ROGAN
*Director of the United States Patent and Trademark Office*